United States Patent
Reisner et al.

[11] 3,879,544
[45] Apr. 22, 1975

[54] METHOD FOR SUPPRESSING HISTAMINE RELEASE

[75] Inventors: David B. Reisner, Hightstown; Bernard J. Ludwig, North Brunswick; George M. Fukui; Frank M. Berger, both of Princeton, all of N.J.

[73] Assignee: Carter-Wallace, Inc., New York, N.Y.

[22] Filed: May 9, 1973

[21] Appl. No.: 358,661

[52] U.S. Cl. .............................. 424/337; 260/609 F
[51] Int. Cl. ............................................ A61k 27/00
[58] Field of Search ................. 424/337; 260/609 F

[56] References Cited
UNITED STATES PATENTS
3,048,577   8/1962   Gaertner ...................... 260/609 F OTHER PUBLICATIONS
Kuliev et al., Chemical Abstracts, Vol. 67, 90489b.

*Primary Examiner*—Albert T. Meyers
*Assistant Examiner*—Norman A. Drezin
*Attorney, Agent, or Firm*—Kevin B. Clarke

[57] ABSTRACT

A method for suppressing the release of histamine from sensitized leukocytes which comprises administering arylthioalkanols of the formula:

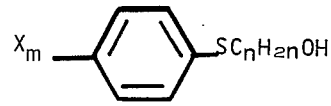

wherein X is halogen or lower alkyl; $m$ is an integer 1 or 2 and $n$ is an integer from 2 to 6 inclusive, in sufficient amount to suppress the release of histamine from said cells.

11 Claims, No Drawings

METHOD FOR SUPPRESSING HISTAMINE RELEASE

The subject of this invention is a class of compounds chemically described as arylthioalkanols which have the ability of suppressing the release of histamine from sensitized leukocytes.

Clinical manifestations of allergic diseases in man are due primarily to the release of histamine from white blood cells which have been sensitized to the agent causing the allergic condition. The released histamine may cause symptoms of allergy such as skin erythema, urticaria, dyspnea, and, in more serious cases, anaphylactic shock. The release of histamine occurs whenever the allergen, i.e., the substance to which the subject is hypersensitive, comes in contact with the sensitized white cells (leukocytes). When this happens, histamine is discharged from these cells and causes the above-mentioned symptoms.

Until the present time only antihistamines were available to allay the symptoms of allergy. Antihistamines do not prevent the discharge of histamine from the sensitized cells. All they do is to decrease the sensitivity of some body cells to the effects of histamine. The substances of our invention have no antihistaminic action. They do not decrease the sensitivity of the receptor cells to the effect of histamine. They act in a novel manner by preventing the discharge of histamine from sensitized cells which occurs when these cells come into contact with their specific allergen.

The compounds of the invention can be represented by the following structural formula:

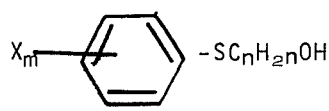

wherein X is halogen or lower alkyl; $m$ is an integer 1 or 2 and $n$ is an integer from 2 to 6, inclusive. As used throughout the instant specification and claims the term lower alkyl shall mean carbon chains containing 1–6 carbon atoms.

The arylthioalkanols which are utilized in the present invention can be conveniently prepared by alkylation of a thiophenol with an ester of a suitable halohydrin and then hydrolysis of the alkylated product (Method A), addition of a thiophenol to an alkylene oxide (Method B), alkylation of a thiophenol with an appropriate halohydrin (Method C), reduction of an ester of an arylthioalkanoic acid (Method D) or an arylthioalkanoic acid (Method F) or an arylthioalkanone (Method E) with a suitable metal hydride or by the reaction of an arylthioalkanone with a Grignard reagent (Method G).

The following examples illustrate the methods of preparing the arylthioalkanols of this invention.

EXAMPLE 1

Preparation of 4-(p-Chlorophenylthio)butanol (Method A)

A mixture of 144.5 g of p-chlorothiophenol, 165 g of 4-chlorobutyl acetate, 88 g of 50 percent aqueous solution of sodium hydroxide, and 750 ml of ethyl alcohol was heated under reflux for 5 hours. An additional 88 g of 50 percent aqueous solution of sodium hydroxide and 250 ml of water were added and on cooling, the oil crystallized. The solid was removed by filtration, washed with water and air-dried. The dried solid was dissolved in trichloroethylene with heating, treated with Norit A, filtered and diluted with an equal volume of hexane. After chilling, the white crystalline solid was removed by filtration. The product weighed 174 to 184 g (80 to 85 percent) and melted at 37°–40°C.

EXAMPLE 2

Preparation of 1-(2,6-Dimethylphenylthio)-2-propanol (Method B)

A mixture of 34.7 g of 2,6-dimethylthiophenol, 22 g of propylene oxide, 22 g of 50 percent aqueous solution of sodium hydroxide and 500 ml of water was heated on a steam bath for 5 hours. After cooling, ether was added, and the 2 layers were separated. The water solution was extracted with more ether, and the ether solutions were combined, washed with water saturated with sodium chloride and dried. The ether was removed on a steam bath, and the residue was distilled at reduced pressure yielding 15.7 g of product.

EXAMPLE 3

Preparation of 3-(p-Chlorophenylthio)propanol (Method C)

To a solution of the 172 g of the sodium salt of p-chlorothiophenol in 500 ml of ethanol was added 100 g of 3-chloropropanol. The mixture was heated at reflux for 3 hours with stirring, cooled, filtered, and the alcohol was removed in vacuo from the filtrate. The residue was distilled at reduced pressure, and the product (152 g) was collected at 118°–119°C and 0.2 mm.

EXAMPLE 4

Preparation of 2-(4-Chloro-3-methylphenylthio)ethanol (Method D)

71.8 g of methyl 4-chloro-3-methylphenylthioacetate, prepared from the corresponding acid, methanol and dry hydrogen chloride, was dissolved in 250 ml of anhydrous ether and added gradually, with stirring, to a mixture of 9.1 g of lithium aluminum hydride and 250 ml of anhydrous ether. When the addition was completed, the mixture was stirred for about 1 hour. Ethyl acetate and water were added to produce a precipitate, and the mixture was filtered. The organic solution was dried, evaporated to dryness and distilled to give 43.7 g of product.

EXAMPLE 5

Preparation of 5-(p-Chlorophenylthio)-2-pentanol (Method E)

To a solution of 56.4 g of 5-(p-chlorophenylthio)-2-pentanone in 800 ml of methanol was added, with stirring and cooling, 10.8 g of sodium borohydride. The mixture was then stirred at room temperature for 6 hours, 90 ml of 20 percent acetic acid was added, and the solution was concentrated to dryness. 250 ml of water was added to the residue, and the mixture was filtered. The solid was air-dried and recrystallized from petroleum ether giving 41.6 g of product.

EXAMPLE 6

Preparation of 2-(p-Chlorophenylthio)-2-methylpropanol (Method F)

A mixture of 52 g of 2-(p-chlorophenylthio)isobutyric acid, 150 ml of 70 percent solution of sodium bis(2-methoxyethoxy) aluminum hydride in toluene and 500 ml of tetrahydrofuran was heated at reflux for 1 hour. The mixture was cooled, treated with 550 ml of 25 percent sulfuric acid and extracted several times with ether. The ether extracts were combined, washed with aqueous solution of sodium hydroxide then water and dried. After evaporation of the ether, the residue was distilled giving 32 g of product.

EXAMPLE 7

Preparation of 5-(p-Chlorophenylthio)-2-methyl-2-pentanol (Method G)

To 3.5 g of magnesium in 25 ml of anhydrous ether under nitrogen was added a few drops of methyl iodide, and the mixture was heated for several seconds. The remainder of 18.8 g of methyl iodide was added along with 35 ml of anhydrous ether while stirring and maintaining gentle reflux. Stirring was continued, and 45 minutes after the addition of the methyl iodide was completed, a solution of 15 g of 5-(p-chlorophenylthio)-2-pentanone in 125 ml of anhydrous ether was added in a rapid stream with some heating. The mixture was heated and stirred for an additional 45 minutes and then cooled. The nitrogen flow was discontinued, 21 ml of a saturated solution of ammonium chloride was added to the cooled mixture and the mixture was decanted. The residue was washed several times with ether, and the ether solutions were combined and dried over anhydrous sodium sulfate. The ether was evaporated, and the residual oil was crystalized and recrystallized from petroleum ether to yield 10.9 g of product.

The new intermediates were prepared as described below in Examples 8, 9 and 10.

EXAMPLE 8

Preparation of 5-(p-Chlorophenylthio)-2-pentanone

To 250 ml of N,N-dimethylformamide was added 21 g of a 57 percent dispersion of sodium hydride in oil. The mixture was stirred, and 72.3 g of p-chlorothiophenol was added. Following the addition, stirring was continued for ½ hour and 61.5 g of 98 percent 5-chloro-2-pentanone was added dropwise with cooling to keep the temperature below 25°C. The mixture was then stirred at room temperature for 75 minutes, allowed to stand overnight and poured into 1 liter of ice water. The solid was removed by filtration and recrystallized from hexane giving 85.5 g of solid melting at 51°-53°C.

EXAMPLE 9

Preparation of Methyl 3-(p-chlorophenylthio)butyrate

A mixture of 57.85 g of p-chlorothiophenol and 0.58 g of sodium methoxide under nitrogen was stirred and heated to 60°C. Methyl crotonate (46 g) was added portionwise with intermittant cooling to maintain the temperature at 60°-70°C. The mixture was then stirred and heated at 80°C for about 2 hours, filtered and the residue was washed with ether. The filtrate and ether washings were combined, concentrated in vacuo and the residue was distilled through a 20 cm Vigreux column. The fraction (76.1 g) boiling at 100°-100.5°C and 0.03 mm was collected.

EXAMPLE 10

Preparation of Methyl 3-(p-chlorophenylthio)-2-methylpropionate 58.15 g of the addition product, b.p. 103° at 0.03 mm, was obtained from 57.85 g of p-chlorothiophenol, 0.58 g of sodium methoxide and 46 g of methyl methacrylate as described for the preparation of methyl 3-(p-chlorophenylthio) butyrate in Example 9.

Table I which follows sets forth the physical characteristics and the method of preparation of a representative number of the arylthioalkanols of this invention. All of the compounds in this table and the intermediates in Examples 8, 9 and 10 were analyzed, and the analytical results obtained were in agreement with the theoretical values.

Table I

| Compound No. | X m | C H n 2n | Method of Prepn. | Bp, °C/mm or Mp, °C |
|---|---|---|---|---|
| 1 | p—CH$_3$ | (CH$_2$)$_4$ | A | 139–42/0.1 |
| 2 | 3—CH$_3$—4—Cl | (CH$_2$)$_2$ | D | 102–6/0.025 |
| 3 | 2,6—diCH$_3$ | CH$_2$CH(CH$_3$) | B | 123–4/2.5 |
| 4 | p—Cl | (CH$_2$)$_4$ | A | 37–40$^a$ |
| 5 | p—Cl | CH$_2$CH(C$_2$H$_5$) | B | 102–8/0.05 |
| 6 | p—Cl | C(CH$_3$)$_2$CH$_2$ | F | 104–5/0.1 |
| 7 | p—Cl | (CH$_2$)$_3$ | C | 118–9/0.2 |
| 8 | p—Cl | CH$_2$CH(CH$_3$)CH$_2$ | D | 103–5/0.05 |
| 9 | p—Cl | CH(CH$_3$)CH$_2$CH$_2$ | D | 109/0.03 |
| 10 | p—Cl | CH$_2$CH$_2$CH(CH$_3$) | E | 104/0.02 |
| 11 | p—Cl | (CH$_2$)$_5$ | A | 50–53$^a$ |
| 12 | p—Cl | CH$_2$CH$_2$CH$_2$CH(CH$_3$) | E | 48–50$^b$ |
| 13 | p—Br | (CH$_2$)$_4$ | A | 45–50$^c$ |
| 14 | o—Cl | (CH$_2$)$_4$ | A | 123–4/0.1 |
| 15 | p—Cl | CH$_2$CH$_2$CH$_2$C(CH$_3$)$_2$ | G | 36–38$^b$ |

Recrystallized from:
$^a$trichloroethylene-hexane.
$^b$petroleum ether.
$^c$cyclohexane.

The in vitro activity of the compounds of the invention was determined in the manner described below:

Assay for Inhibition of Histamine Release

The procedure published by L. M. Lichtenstein and A. G. Osler, J. EXPTL. MEDICINE, 120:507–530, 1964, for the determination of histamine from human leukocytes, was used to measure histamine release from sensitized rabbit leukocytes. Forty-five ml of blood, drawn by cardiac puncture from ragweed-sensitized rabbits with a plastic syringe containing 250 units of heparin in 5 ml of physiological saline solution, was used. Measurements were made of the total amount of histamine in the leukocytes, the amount of histamine released with the specific antigen (ragweed), the amount of histamine released spontaneously (cell blanks), and the amount of histamine released in the presence of various concentrations of drugs under test.

Appropriate controls for buffer, antigen and drugs were included and an internal histamine standard curve was established with each experiment. Inhibition of histamine release was computed from the amount of histamine released by the ragweed antigen in the presence and absence of the drug, i.e., the difference between the quantity of histamine released spontaneously and the amount released by antigen.

Table II which follows shows the $ED_{50}$ (molar concentration required to give 50 percent inhibition of histamine release) of some of the compounds in this invention and demonstrates the activity of these compounds relative to that of 3-p-chlorophenoxy-1,2-propanediol (chlorphenesin). The latter compound has been reported to inhibit histamine release from human leukocytes (L. M. Lichtenstein and N. F. Adkinson, J. Immunology, 103:866, 1969).

Table II

| Compound (Table I) | Relative In vitro inhibition of Histamine Release | $ED_{50} \pm$ S.E.M. (Molar) |
|---|---|---|
| 3-p-Chlorophenoxy-1,2-propanediol | 1 | $3.3 \pm 0.54 \times 10^{-4}$ |
| 1 | 52 | $6.3 \pm 0.24 \times 10^{-6}$ |
| 4 | 114 | $2.9 \pm 1.1 \times 10^{-6}$ |
| 5 | 52 | $6.3 \pm 0.55 \times 10^{-6}$ |
| 8 | 83 | $4.0 \pm 0.65 \times 10^{-6}$ |
| 12 | 97 | $3.4 \pm 1.3 \times 10^{-6}$ |
| 13 | 70 | $4.7 \pm 1.2 \times 10^{-6}$ |
| 14 | 94 | $3.5 \pm 1.2 \times 10^{-6}$ |
| 15 | 122 | $2.7 \pm 0.78 \times 10^{-6}$ |

In order to show that the arylthioalkanols of the present invention inhibit the release of histamine when administered orally to ragweed-sensitized rabbits, the following in vivo experiment was carried out:

Five ml of blood was drawn by cardiac puncture from a ragweed-sensitized rabbit to ascertain the basic histamine content of the blood. The amount of histamine released by the addition of 50 μg of antigen N per ml of the assay system was determined. The rabbit was then treated orally with 100 mg/kg of drug using a catheter. One and 5 hr following administration of drug, 5 ml of blood was withdrawn and assayed for histamine by the spectrofluorometric method described by P. A. Shore, A. Burkhalter and V. H. Cohn, Jr., J. Pharmacol. and Exptl. Therap., 127:182, 1959. The percentage inhibition of histamine release was computed from the amount of histamine released before and at 1 and 5 hr following administration of drug. Compounds 3, 12 and 15 in Table I gave 31, 57 and 51 percent inhibition of histamine, respectively, 1 hr after drug treatment and compound 4 was very effective up to 5 hr, inhibiting the release of histamine by 43 percent.

The arythioalkanols of this invention are preferably administered orally in the form of tablets, capsules, or the like. The compounds may also be administered using a suspension of the compound in water or isotonic saline solution or a solution of the compound in a solvent consisting of aqueous propylene glycol or polyethylene glycol. In addition to the active ingredient, the tablet contains conventional fillers, excipients, lubricants, etc. The active compound is generally in an amount from 25 to 95 percent by weight of the total composition.

What is claimed is:

1. A method for suppressing the release of histamine from sensitized leukocytes in a warm blooded animal in need of such treatment which comprises administering internally to said animal, in an amount sufficient to suppress the release of histamine in said animal, a compound selected from the group of compounds having the formula:

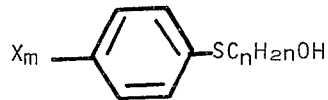

wherein X is halogen or lower alkyl; $m$ is an integer 1 or 2 and $n$ is an integer from 2 to 6, inclusive.

2. The method of claim 1 wherein X is lower alkyl; $m$ is an integer 1 or 2 and $n$ is an integer from 2 to 6, inclusive.

3. The method of claim 1 wherein X is chlorine; $m$ is an integer 1 and $n$ is an integer from 2 to 6, inclusive.

4. The method of claim 1 wherein the compound is 4-(p-tolylthio)butanol.

5. The method of claim 1 wherein the compound is 4-(p-chlorophenylthio)butanol.

6. The method of claim 1 wherein the compound is 1-(p-chlorophenylthio)-2-butanol.

7. The method of claim 1 wherein the compound is 3-(p-chlorophenylthio)-2-methylpropanol.

8. The method of claim 1 wherein the compound is 5-(p-chlorophenylthio)-2-pentanol.

9. The method of claim 1 wherein the compound is 4-(o-chlorophenylthio)butanol.

10. The method of claim 1 wherein the compound is 5-(p-chlorophenylthio)-2-methyl-2-pentanol.

11. The method of claim 1 wherein the compound is 1-(2,6-dimethylphenylthio)-2-propanol.

* * * * *